(12) United States Patent
Kashihara et al.

(10) Patent No.: US 6,754,160 B2
(45) Date of Patent: Jun. 22, 2004

(54) OPTICAL DISK DEVICE AND INFORMATION REPRODUCING DEVICE PERFORMING MAXIMUM DECODED OFFSET PROCESS, AND REPRODUCING METHODS THEREOF

(75) Inventors: Yutaka Kashihara, Chigasaki (JP); Shintaro Takehara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/327,615

(22) Filed: Dec. 24, 2002

(65) Prior Publication Data

US 2003/0137914 A1 Jul. 24, 2003

(30) Foreign Application Priority Data

Dec. 26, 2001 (JP) .................................. 2001-395288

(51) Int. Cl.[7] .................................................. G11B 7/00
(52) U.S. Cl. .................................. 369/59.22; 369/59.12
(58) Field of Search ............................ 369/59.21, 59.22, 369/59.12, 59.2

(56) References Cited

U.S. PATENT DOCUMENTS 6,552,988 B1 * 4/2003 Nishiwaki et al. ......... 369/59.22

FOREIGN PATENT DOCUMENTS

| JP | 7-262694 | * 10/1995 | .............. 369/59.22 |
| JP | 8-263943 | 10/1996 | |
| JP | 11-120702 | 4/1999 | |
| JP | 2000-11549 | * 1/2000 | .............. 369/59.22 |

OTHER PUBLICATIONS

Nakajima et al., "A Study of PRML Systems for a Phase Change Optical Disk," Technical Report of IEICE, (Dec. 1995).

* cited by examiner

*Primary Examiner*—Nabil Hindi
(74) *Attorney, Agent, or Firm*—Pillsbury Winthrop LLP

(57) ABSTRACT

An optical disk device has reproduction signal detecting section, each of which detects a reproduction signal corresponding to a reflective wave of an optical disk, a first offset controller, which offsets the reproduction signal with a first offset value F1, an A/D converting circuit, which A/D converts the offset reproduction signal, and a second offset controller, which offsets the converted digital reproduction signal with a second offset value F2, and a decoder, which viterbi decodes the offset digital reproduction signal and outputs decoded data B. Because an offset is performed with each exclusive value to A/D conversion and viterbi decoding, it is possible to obtain high identification accuracy with nonlinear characteristic eliminated.

8 Claims, 9 Drawing Sheets

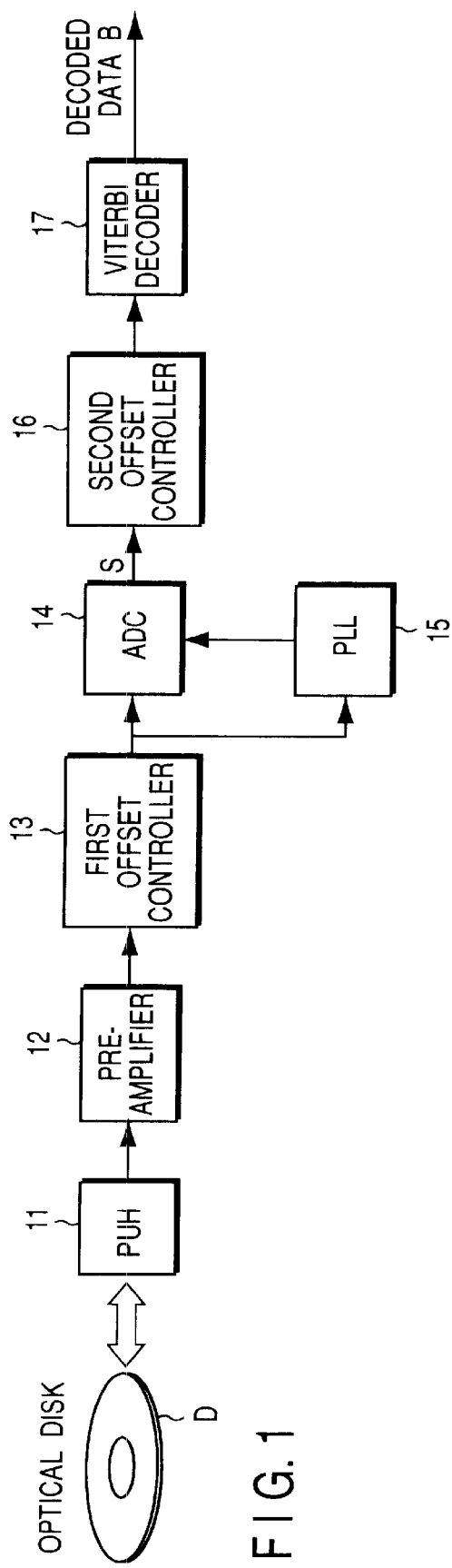
F I G. 1
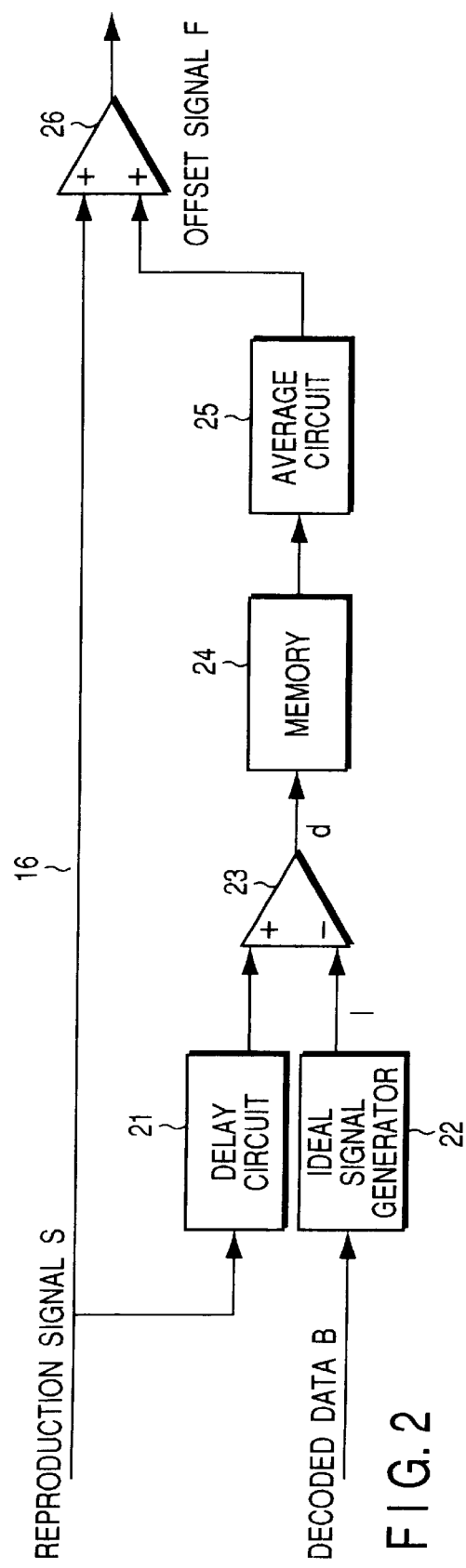
F I G. 2

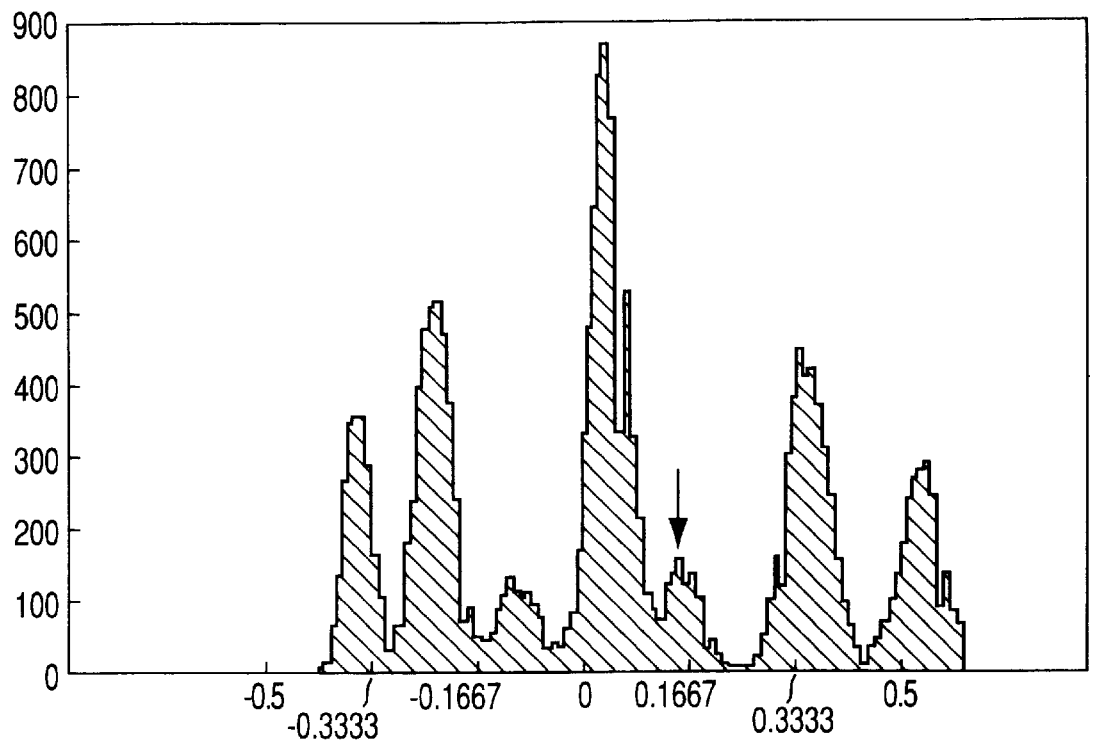
F I G. 4
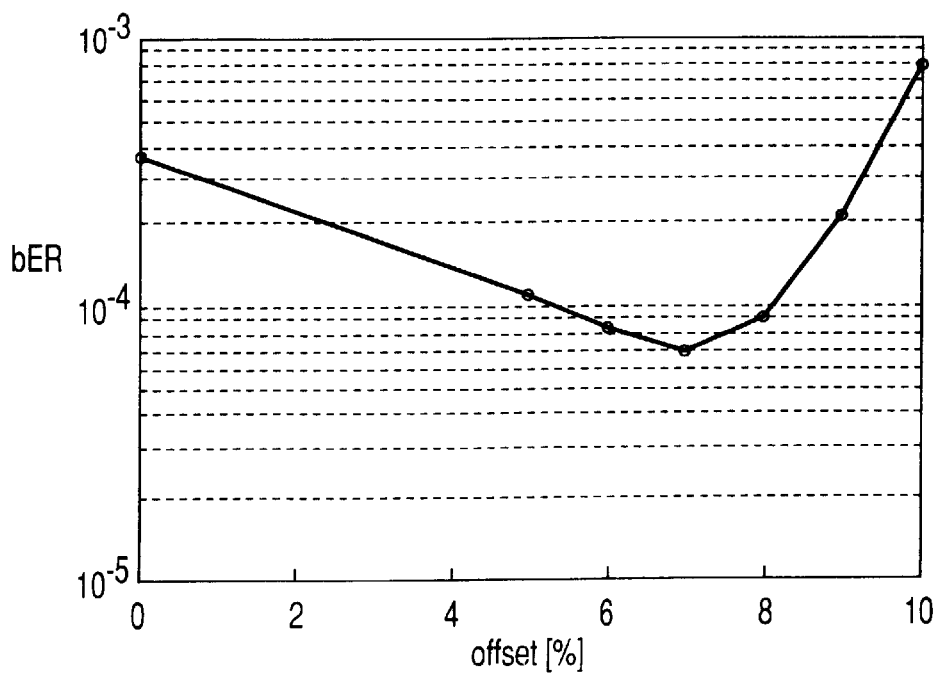
F I G. 5

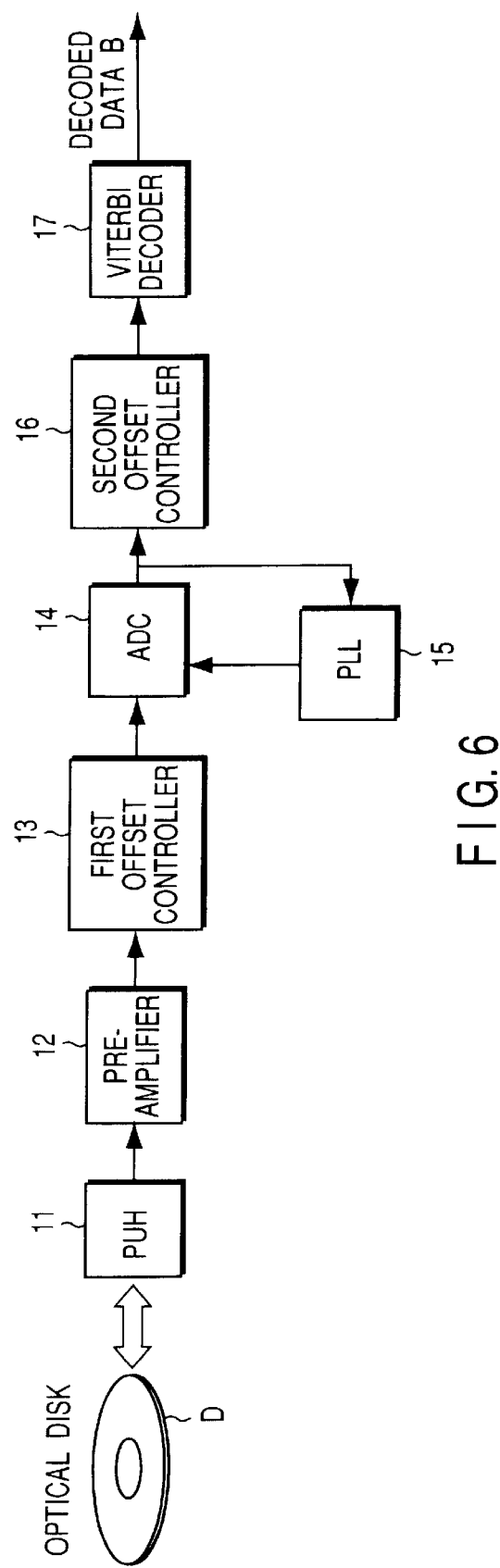
F I G. 6

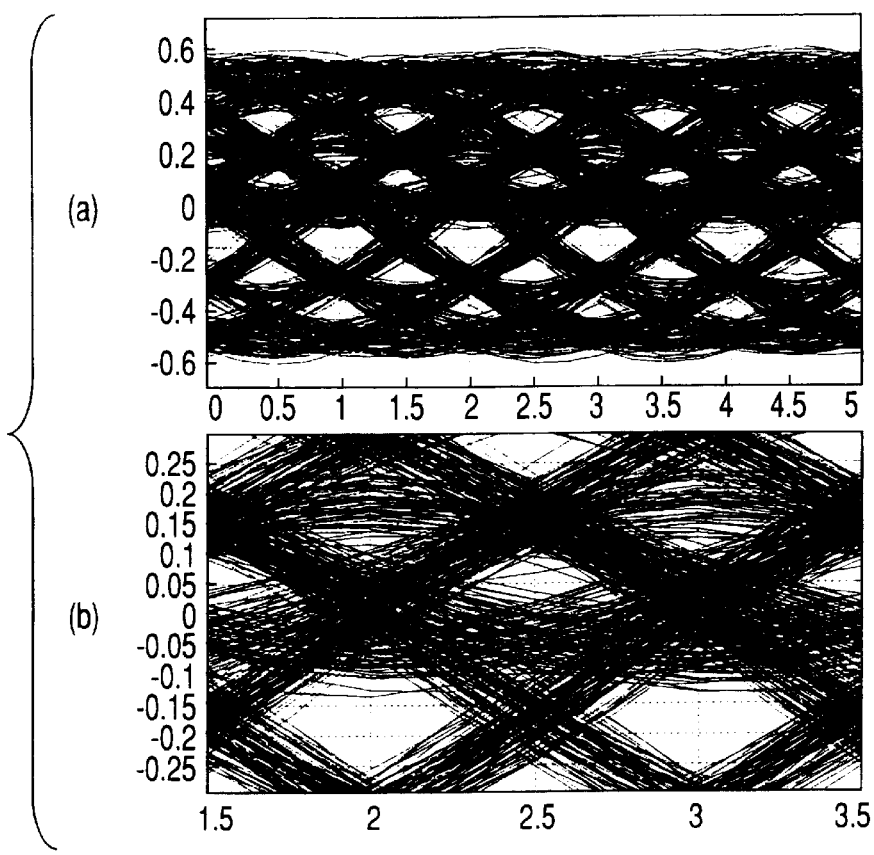
F I G. 11
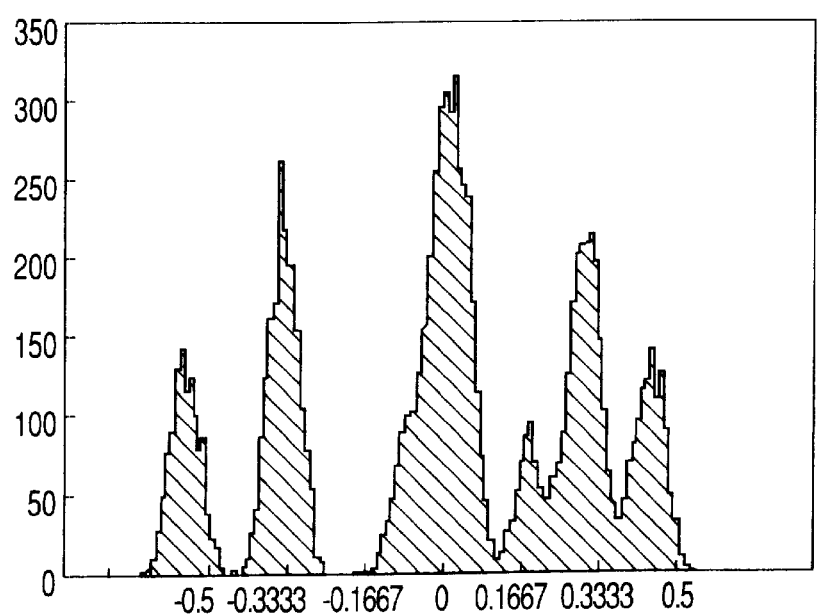
F I G. 12

OPTICAL DISK DEVICE AND INFORMATION REPRODUCING DEVICE PERFORMING MAXIMUM DECODED OFFSET PROCESS, AND REPRODUCING METHODS THEREOF

CROSS-REFERENCE TO RELATED APPLICATIONS

This application is based upon and claims the benefit of priority from the prior Japanese Patent Application No. 2001-395288, filed Dec. 26, 2001, the entire contents of which are incorporated herein by reference.

BACKGROUND OF THE INVENTION

1. Field of the Invention

This invention relates to an optical disk device using a PRML method, in particular, to a PRML method optical disk device that performs a maximum decoded offset process.

2. Description of the Related Art

Recently, there has been widely spread an optical disk device that performs a recording and reproducing process to an optical disk such as a DVD (Digital Versatile Disk), which has been developed variously and produced. For example, as a method of recording and reproducing process of an optical disk device, there is a PRML (Partial Response and Maximum Likelihood) method.

In a conventional optical disk device that does not have characteristics of the present invention, in general, information recorded in an optical disk is reproduced as faint analog signal with use of a PUH (Pick Up Head). The analog signal is amplified by a preamplifier to the sufficient signal level, and then an offset of the reproducing signal is adjusted by an offset controller. After the offset adjustment, the reproducing signal is transmitted to an ADC (Analog to Digital Converter) circuit and a PLL (Phase Lock Loop). In the PLL, a clock is generated from the timing when the reproducing signal crosses the zero level, and the generated clock is transmitted the ADC circuit. In the ADC circuit, the reproducing signal is sampled with the clock from the PLL, and transferred into a digital signal. From the digitized reproducing signal, binary decode data are obtained by a viterbi decoder.

In such an optical disk device, in a case where a great deal of asymmetry that is asymmetric element is included in the reproducing signal, if an offset value is determined so as to achieve sufficient performance of the PLL circuit and added, the viterbi decoder cannot be performed sufficiently. On the contrary, when the offset value is set so as to achieve the performance of the viterbi decoder and added, the PLL circuit cannot be performed satisfactorily.

Further, a problem lies in that, when it is attempted that the asymmetry (asymmetric element) is eliminated by obtaining the average level, in all of the reference levels, for example, about the level-7 in PR (1, 2, 2, 1) characteristics to use a reference level of the viterbi decoder, the circuits become very complicated.

BRIEF SUMMARY OF THE INVENTION

The present invention has been developed in consideration of the aforementioned circumstances and an object thereof is to provide an optical disk device through which high identification performance can be obtained by adding simple offset controller even in a case where a reproducing signal includes a great deal of asymmetry (asymmetric element).

The invention is an optical disk device characterized by comprising: reproduction signal detecting section which rotates an optical disk at a predetermined number of revolutions, irradiates a laser beam, and detects a reproduction signal corresponding to a waveform pattern of the reflected wave; a first offset section which performs an offset with a first offset value to the reproduction signal detected by the reproduction signal detecting section; A/D converting section which A/D converts the reproduction signal and outputting a digital reproduction signal based on the reproduction signal offset by the first offset section; second offset section which performs an offset with a second offset value different from the first offset to the digital reproduction signal from the A/D converting section; and maximum likelihood decoding section which decodes the digital reproduction signal offset by the second offset section with use of a maximum likelihood decoder so as to output binary decoded data according to the predetermined information.

That is, according to the present invention, while an offset is performed by obtaining an offset value for PLL circuit, which is reference of an A/D converter of the detected reproduction signal, another offset value for a maximum likelihood decoder, e.g., viterbi decoder is independently obtained and a reproduction signal is offset according to the later obtained offset value. Therefore, it is possible to eliminate asymmetry (asymmetric element) stably with the offset value for the viterbi decoder and decode reproduction information with high identification accuracy, while unfailingly A/D converting the reproduction signal.

In addition, the invention is an optical disk device characterized by comprising: reproduction signal detecting section which rotates an optical disk at a predetermined number of revolutions, irradiating a laser beam, and detects a reproduction signal corresponding to a waveform pattern of the reflected wave; A/D converting section which A/D converts the reproduction signal and outputs digital reproduction signal; offset section which offsets the digital reproduction signal outputted from the A/D converting section with a predetermined offset value; and maximum likelihood decoding section which decodes the digital reproduction signal offset by the offset section with use of a maximum likelihood decoder so as to output binary decoded data according to the predetermined information.

That is, according to the invention, without an offset for the A/D converter, but if an offset value is separately obtained for viterbi decoder and the reproduction signal is offset according to the obtained value, it is possible to provide an optical disk device capable of eliminating the asymmetry (asymmetric element) unfailingly with the offset value for the viterbi decoder and decoding the reproduction information with high identification accuracy. As a result, it is possible to reproduce highly accurate recording information from which the asymmetry (asymmetric element) has been eliminated through a simple circuit structure.

BRIEF DESCRIPTION OF THE SEVERAL VIEWS OF THE DRAWING

FIG. 1 is a block diagram showing an example of an optical disk device of the PRML method according to the present invention;

FIG. 2 is a block diagram showing a structural example of the first second-offset controller according to the invention;

FIG. 4 is a graph showing an example of reference level for determining the offset value of the second-offset controller according to the invention;

FIG. 5 is a graph showing an identification performance characteristic to offset;

FIG. 6 is a block diagram showing an example of another optical disk device of the PRML method according to the invention;

FIG. 11 is a graph showing eye patterns of the reproducing signal having a great deal of asymmetry in the optical disk device of the PRML method;

FIG. 12 is a histogram of identification point signal level of the reproducing signal having a great deal of asymmetry in the optical disk device of the PRML method.

DETAILED DESCRIPTION OF THE INVENTION

An embodiment of the present invention now will be described in detail with reference to the drawings below.

Figure 3:
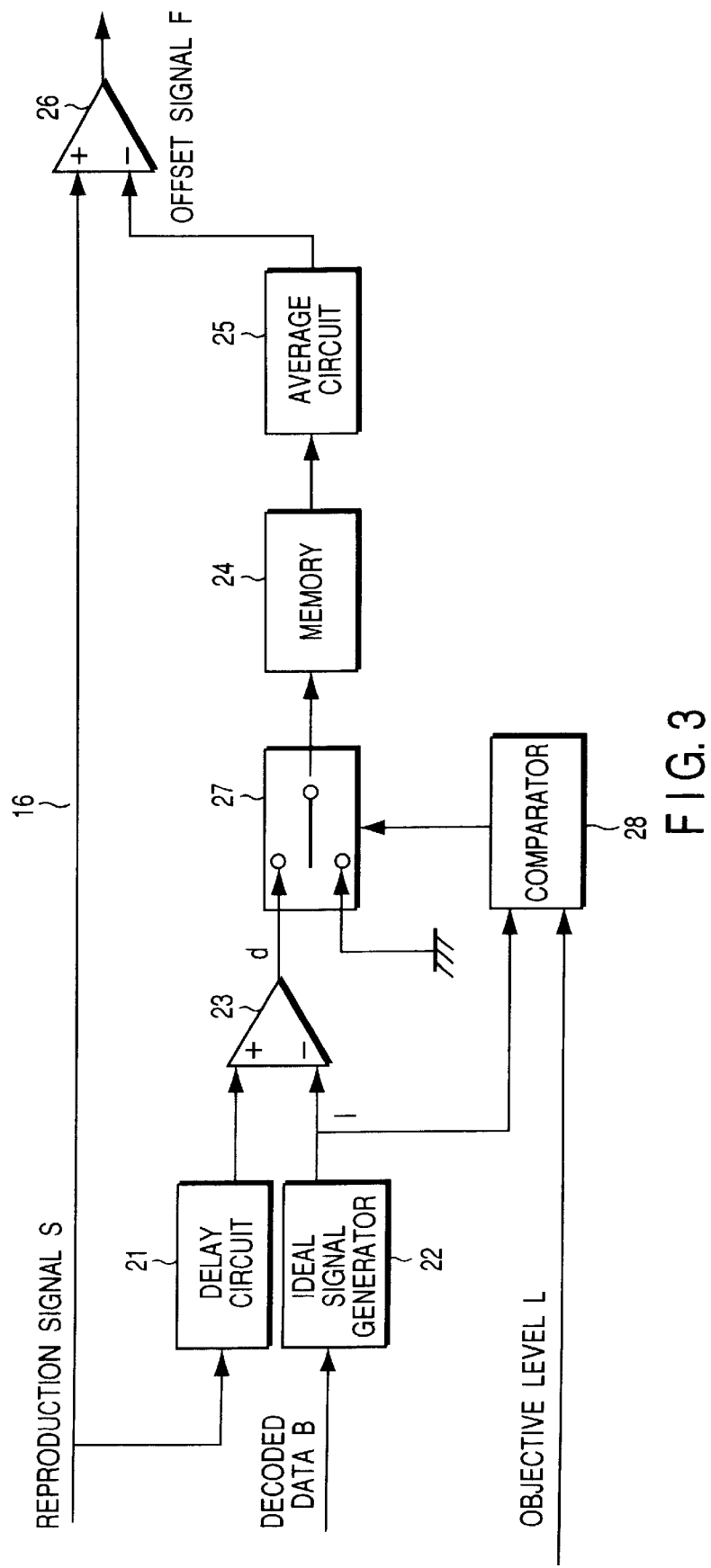
FIG. 3 is a block diagram showing a structural example of the second second-offset controller according to the invention.
Figure 7:
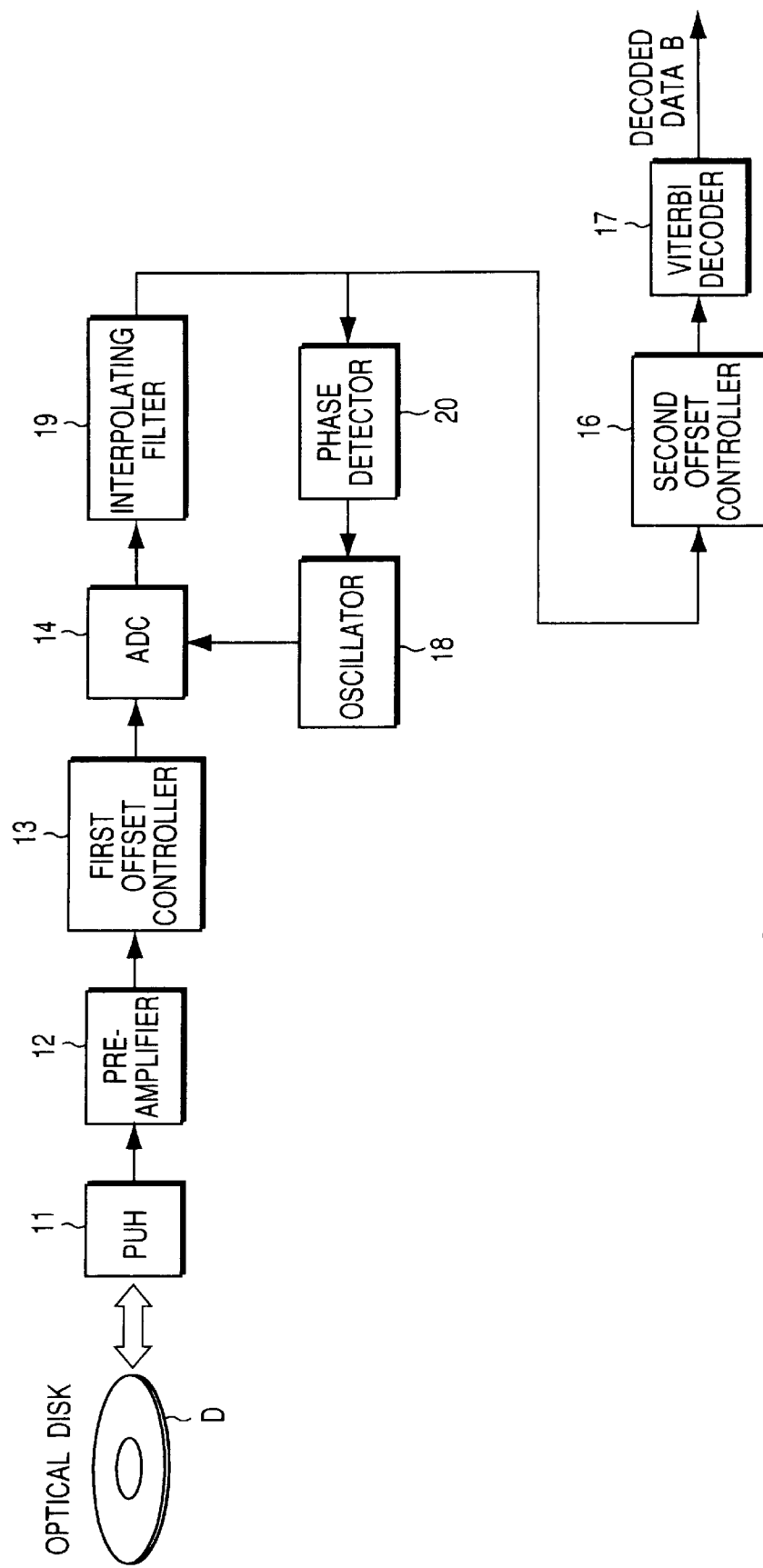
FIG. 7 is a block diagram showing an example of another optical disk device of the PRML method according to the invention.
Figure 8:
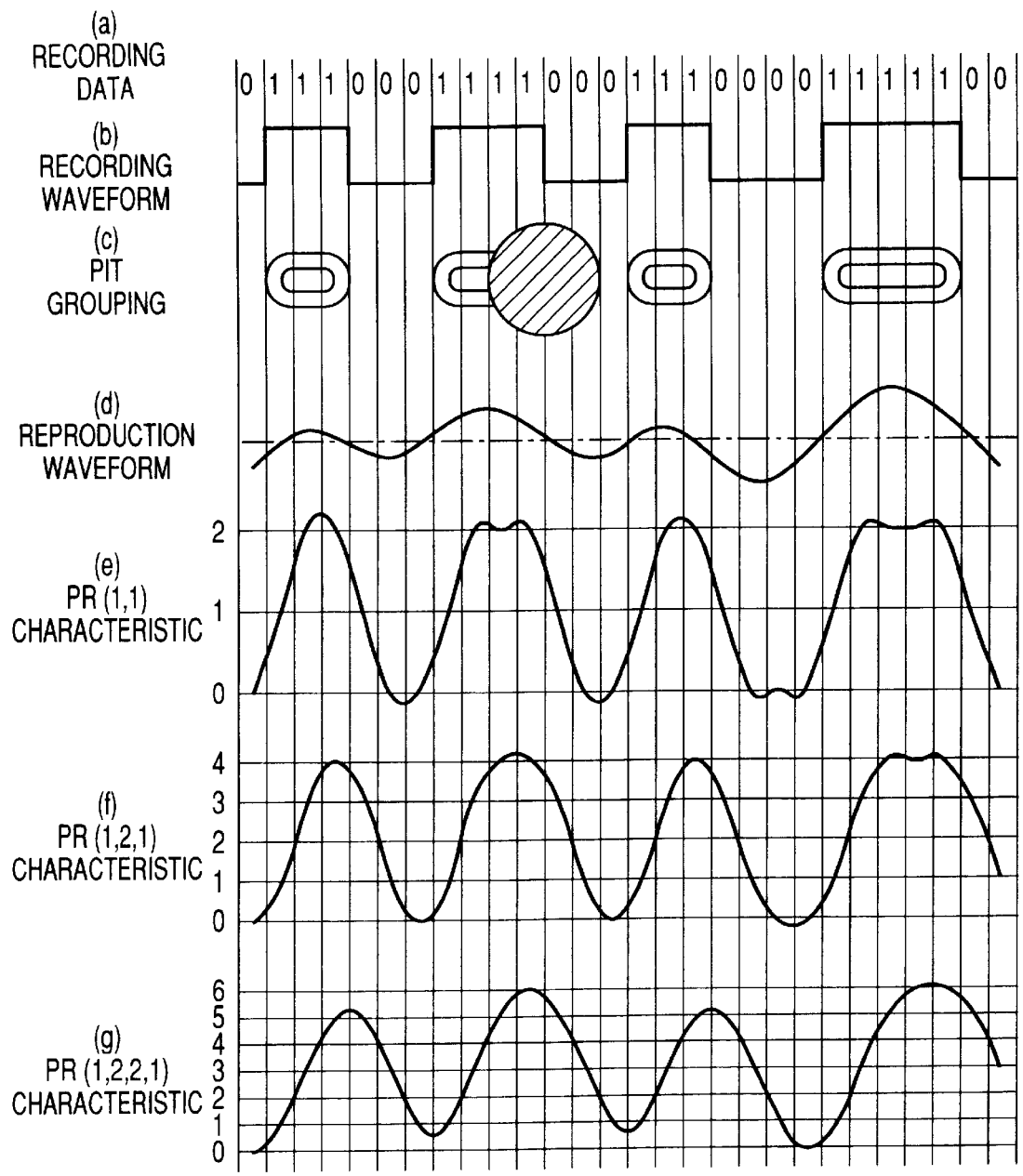
FIG. 8 is a movement waveform chart for explaining the PRML method according to the invention.

FIG. 1 is a block diagram showing an example of an optical disk device of the PRML method according to the invention. FIG. 2 is a block diagram showing a structural example of the first second-offset controller according to the invention. FIG. 3 is a block diagram showing a structural example of the second second-offset controller according to the invention. FIG. 4 is a graph showing an example of reference level for determining the offset value. FIG. 5 is a graph showing an identification performance characteristic to offset. FIG. 6 and FIG. 7 are block diagrams showing an example of another optical disk device according to the invention. FIG. 8 is a movement waveform chart for explaining the PRML method according to the invention.

<Structure of the Optical Disk Device According to the Invention>

As shown in FIG. 1, the optical disk device of the PRML method according to the invention has a driving mechanism (not shown) which holds an optical disk D and rotates at a predetermined number of rotation, PUH (Pick Up Head) 11 including an optical pick-up etc., preamplifier circuit 12 which appropriately amplifies the signal from the PUH, and a first offset controller 13 which offsets a reproducing signal with first offset value based on the reproducing signal transmitted from the preamplifier circuit 12. The optical disk device further includes an A/D converter circuit 14 to which the offset reproducing signal is supplied, and a PLL circuit 15 to supply a clock to the A/D converter circuit 14, thereby supplying the digital reproducing signal, which has been A/D converted, to a second offset controller 16. Here, the second offset controller 16 is a characteristic structure in the invention, which obtains exclusive offset value in a viterbi decoder 17, which is different from the first offset controller 13, and performs offset.

<Effectiveness of the Optical Disk Device According to the Invention>

In the optical disk device according to the invention, which is shown in FIG. 1, various PR characteristics will be described using FIG. 8, and further the relationship between an offset process particular in the invention and viterbi decode will be described with reference to the drawings.

(PRML Method)

Portions of (a) to (d) in FIG. 8 show recording data, recording waveform, pit groupings, reproducing waveform, respectively. Further, portions of (e), (f) and (g) in FIG. 8 show equalized waveforms, which are prepared by equalizing the reproducing waveform on (d) in FIG. 8 by an equalizer based on PR (1, 1) characteristic, PR (1, 2, 1) characteristic, and PR (1, 2, 2, 1) characteristic.

In this embodiment, the PR (1, 1) characteristic means that impulse response appears at two sequential identification points at the ratio of 1 to 1. The PR (1, 2, 1) characteristic means that impulse response appears at three sequential identification points at the ratio of 1 to 2 to 1. Further, the PR (1, 2, 2, 1) characteristic means that impulse response appears at four sequential identification points at the ratio of 1 to 2 to 2 to 1. Although it is not shown, the other PR characteristics are the same.

As described above, the PRML method is a method of coding and decoding any one of the PR (1, 1) characteristic, PR (1, 2, 1) characteristic, and PR (1, 2, 2, 1) characteristic. Therefore, if information is recoded in the PR (1, 2, 2, 1) characteristic, the signal is reproduced with the PR (1, 2, 2, 1) characteristic and decoded, thereby reproducing the original information properly.

As shown in (e), (f), and (g) in FIG. 8, it is clear that the waveform becomes blunter in the order of the PR (1, 1), the PR (1, 2, 1), and the PR (1, 2, 2, 1) characteristic. In these three waveforms, the PR (1, 2, 2, 1) characteristic has high resolution against information recorded at the highest density and strength against noise. In the embodiment of the invention, for the sake of convenience, the PR (1, 2, 2, 1) characteristic will be described in detail as an example. However, needless to say that the other characteristics have the equivalent effect to that of the PR (1, 2, 2, 1) characteristic.

In reproduction signal processing series of the PRML method, the viterbi decoder, which is one of typical maximum likelihood decoders, is generally used as a detector. The viterbi decoder selects a series, which has the minimum error against a sample series of the reproduction signal, out of all of the series satisfying the PR (1, 2, 2, 1) characteristic and outputs decoded data corresponding to the selected series. In the PRML method, a decoding process is performed not from one sample value but from plural values, therefore, resistance against signal deterioration elements which have no correlation between the samples, thereby obtaining high identification performance. The details of the viterbi algorithm has been disclosed in, for example, U.S. Pat. No. 6,148,043. Therefore, the details are omitted here.

(Two Offset Processes in the Invention)

Next, an offset process that is a characteristic of the invention will be described with reference to the drawings. Assume that information coded with use of a (1, 7) RLL code that is one of RLL (Run-Length Limit) code is recorded in an optical disk D as a pit. Further, assume that the PR (1, 2, 2, 1) characteristic is used as the PR characteristic. Then, the information recorded in the optical disk is reproduced as a faint analog signal with use of a PUH 11. After the analog signal is amplified by a preamplifier and reaches sufficient level, the offset of the reproducing signal is adjusted so as to adopt a clock signal (will be described later) as the most appropriate value by a first offset controller 13. The reproduction signal after the offset adjustment is transmitted to an ADC circuit 14 and a PLL circuit 15.

In the PLL circuit 15, a clock signal is generated from the timing when the reproduction signal crosses the zero level, and the generated clock signal is transmitted to the ADC circuit 14. In the ADC circuit 14, the reproduction signal is sampled with the clock signal from the PLL circuit 15 and transferred into a digital signal. The digitized reproduction signal S is transmitted to a second offset controller 16, and then the offset of the reproduction signal is adjusted for appropriate for viterbi decoder in the second offset controller 16. After the second offset adjustment, the reproduction signal is transmitted to a viterbi decoder 17, and a binary decoded data in the viterbi decoder 17 is obtained.

The purpose of the first offset adjustment is to exercise the performance of the PLL circuit 15, and the purpose of the second offset adjustment is to exercise the performance of the viterbi decoder 17. When an asymmetry (asymmetric element) of the reproduction signal is contained less, the offset level at which the PLL circuit 15 performs sufficiently coincides the offset level at which the viterbi decoder 17 performs sufficiently. Therefore, the only first offset has to be adjusted. When an asymmetry (asymmetric element) of the reproduction signal is contained a lot, these two offset levels are different. The reason for that will be described below.

Figure 9:
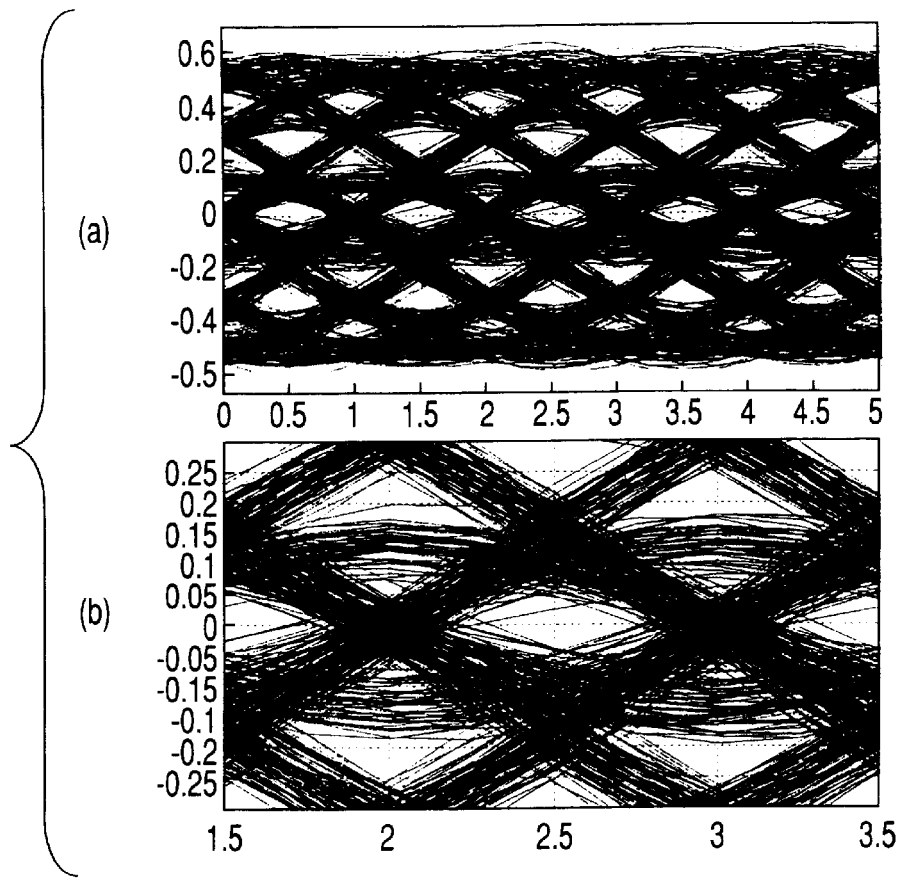
FIG. 9 is a graph showing eye patterns of a reproducing signal having less asymmetry (asymmetric element) in the optical disk device of the PRML method.
Figure 10:
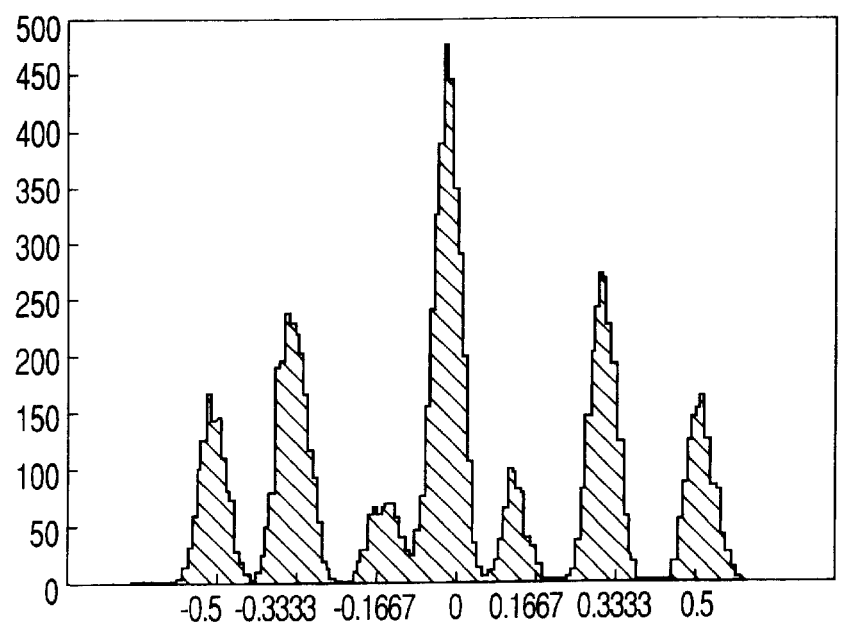
FIG. 10 is a histogram of the identification point signal of the reproducing signal having less asymmetry in the optical disk device of the PRML method.

In general, the level to be phase detected by the PLL circuit 15 is one kind, for example, it is close to zero-level in FIG. 11. In this embodiment, (a) and (b) in FIG. 9, and FIG. 10 are graphs showing amplitude values defining symmetric characteristics. Portions of (a) and (b) in FIG. 11 and FIG. 12 are graphs showing amplitude values defining asymmetric characteristics. In FIG. 11, the opening ratio of eye pattern shows maximum at the vicinity of zero-level. In the PLL circuit 15, a phase error is detected from the timing when the reproduction signal crosses one kind of level to be phase-detected, and the clock signal is adjusted with use of the detected amount of the phase error. On the other hand, the signal level at the identification point in the PRML method becomes N-level (N>2). In the viterbi decoder 17, identification is performed with use of temporal correlation of the reproduction signals distributed about N-level. When the reproduction signal S contains a great deal of asymmetry (asymmetric element), the distribution of the N-level becomes unbalanced as shown in FIG. 12. There is no way to adjust offset to coincide the center of all of the N-levels with ideal level.

As described above, one kind of level is used in the PLL circuit 15. On the contrary, N-kind of levels are used in the viterbi decoder 17. Arising from this fact, the optimum offset level in the PLL circuit 15 and the optimum offset level in the viterbi decoder 17 are different. Each offset process is performed at each offset level, and therefore the asymmetry (asymmetric element) can be eliminated. As a result, it is possible to attain high identification accuracy by the viterbi decode.

Here, the optimum offset level in the PLL circuit 15 is the level at which the opening ratio of the eye pattern shown in (b) in FIG. 11, as described above. On the other hand, the optimum offset level in the viterbi decoder 17 varies depending on reproduction signal characteristics.

As an example of a concrete structure of a second offset controller, an offset controller shown in FIG. 2 will be described. In FIG. 2, an ideal signal generator 22 generates an ideal signal I of the PR (1, 2, 2, 1) characteristic from the decoded data. An error signal d, which is a difference between the ideal signal I and the reproduction signal whose phase is adjusted by a delay circuit 21, is calculated and stored on a memory 24 for a certain period. The average value of the error signal d stored for a certain period is calculated. Assuming the average value of the error signal d as an offset signal F defining the amount of offset, and the offset signal F is subtracted from the reproduction signal S by a subtraction period 26.

Further, a structural example of still another offset controller will be described with reference to FIG. 3. This offset controller 16 has partly common structure to the offset controller 16 shown in FIG. 2. However, the offset controller shown in FIG. 2 always records and stores the error signal d, on the contrary, the controller shown in FIG. 3 stores the error signal d only when the ideal signal I stays at a certain value. This shows a method of calculating more appropriate offset value so as to eliminate the asymmetry (asymmetric element), and an objective level is a certain amplitude value as shown with an arrow in FIG. 4.

That is, in FIG. 3, an ideal signal generator 22 generates the ideal signal I of the PR (1, 2, 2, 1) characteristic from the decoded data B. The error signal d, which is the difference between the ideal signal I and the reproduction signal whose phase is adjusted by the delay circuit 21, is calculated. The ideal signal I is also transmitted to a comparator 23. In the comparator 23, when the ideal signal I coincides with the objective level L, a "high" signal is outputted. When the ideal signal I is different from the objective level L, a "low" signal is outputted. A selector 27 transmits the error signal d only when the "high" signal is transmitted from the comparator 23. The average value of the error signal d stored for a certain period in the memory 24 is calculated. Assuming the average value of the error signal d as the offset signal F defining the amount of offset, and the offset signal F is subtracted from reproduction signal S by the subtraction period 26.

Here, the objective level L is an amplitude value that is compared to the ideal signal I of the decoded data B, which is supposed to be the best for picking up a sample for determining an offset value. For example, in a graph shown in FIG. 4, the fifth level that is the amplitude value denoted with an arrow is suitable. However, other levels, i.e., 1 to N-1th can be selected.

That is, the selection of the objective level depends on the characteristic of the reproduction signal S. FIG. 4 shows a histogram of the identification point signal level when the offset adjustment is performed so that the identification performance becomes optimal by an experiment. FIG. 5 shows a graph showing an identification performance characteristic to offset. Focusing attention on FIG. 4, the offset is adjusted such that the fifth level from the left, which is larger than the center level shown with an arrow, coincides with the ideal level. That fact has been clear from experience that the identification attitude of the viterbi decode is high when one size larger level than the center of the identification point signal level, or one size smaller level than the center level is selected as the objective level.

As described above, in the embodiment according to the invention, not only the offset value for finding accurately the clock used for the A/D conversion circuit but also the proper offset value for eliminating the asymmetry (asymmetric element) of the viterbi decode is obtained. The respective offset processes are carried out independently, so that the asymmetry (asymmetric element) in viterbi decoder can be eliminated. As a result, it becomes possible to reproduce an optical disk device by the viterbi decoder to obtain highly accurate identification result.

<Other Embodiment of the Invention>

Figure 13:
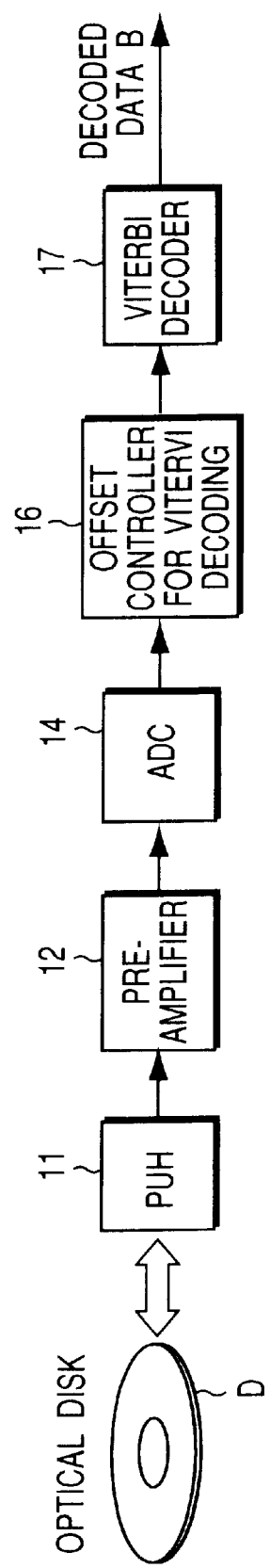
FIG. 13 is a block diagram showing another example of the optical disk of the PRML method according to the invention.

Further, as an embodiment of the invention, FIGS. 6 and 7 are block diagrams showing an example of another optical disk device of the PRML method. FIG. 13 is a block diagram showing another example of the optical disk device of the PRML method according to the invention.

That is, in the aforementioned embodiment, the example has been described in that an analog PLL circuit is used. However, in the present invention it is possible to adopt a method of using a digital PLL circuit shown in FIG. 6. In this case, a clock signal is generated in the PLL circuit 15 based on the converted digital signal.

Further, the invention can be applied to a method of using asynchronous sampling method shown in FIG. 7. The A/D converter 14 is operated by the clock from an oscillator 18, and an interpolating filter 19 involving a phase detector 20 is also provided.

And further, in the embodiment described above, the example of the PR (1, 2, 2, 1) characteristic and the (1, 7) RLL code is described. However the invention can be applied to the case where the other PR characteristics and RLL codes are used, and the equivalent effects can be obtained.

Further, in the embodiment described above, two offset circuits 13 and 16 are used as the embodiment of the invention. However, in order to eliminate the asymmetry (asymmetric element) of the viterbi algorithm, the first offset controller 13 is not necessarily required. As the structure shown in FIG. 13, even the first offset circuit 13 is omitted, no significant difference occurs in regard to operation. The asymmetry (asymmetric element) of the characteristics in viterbi decoder can be eliminated and higher identification performance can be achieved.

Furthermore, in the embodiment described above, the optical disk device has been described as an example. However, the invention does not necessarily require an optical disk as a recording medium. The invention can achieve the equivalent effects with the equivalent mechanism with, for example, as long as a recording medium such as a hard disk, an IC card and the like.

As described in detail, according to the invention, it is possible to provide an optical disk device capable of viterbi decoder with higher identification performance than heretofore by finding an exclusive offset value and performing an offset with the relevant value in order to eliminate the asymmetry (asymmetric element) of the viterbi decode of the PRML method, and capable of reproducing stably without causing an error identification even in a reproduction process on, such as an optical disk with high recording density.

What is claimed is:

1. An optical disk device rotates an optical disk at a predetermined rotation number, irradiates a laser beam, to the optical disk, comprising:

reproduction signal detecting section which detects a reproduction signal in accordance with a waveform pattern of the reflected wave;

first offset section which offsets the reproduction signal detected by the reproduction signal detecting section with a first offset value;

A/D converting section which A/D converts the reproduction signal to a digital reproduction signal based on the reproduction signal offset by the first offset section;

second offset section which offsets the digital reproduction signal from the A/D converting section with a second offset value different from the first offset value; and maximum likelihood decoding section which decodes the digital reproduction signal offset by the second offset section with use of a maximum likelihood decoder so as to output binary decoded data according to predetermined information.

2. The optical disk device according to claim 1, wherein the second offset section obtains the average value of error signals, which are the difference between an ideal signal generated based on the decoded data decoded by the maximum likelihood decoder and the digital reproduction signal outputted from the A/D converting section, as the second offset value, and offsets the digital reproduction signal outputted from the A/D converting section with use of the obtained average value.

3. The optical disk device according to claim 1, wherein, when a predetermined reference value and the ideal signal generated based on decoded data decoded by the maximum likelihood decoder are equal, the second offset section accumulates an error signal that is the difference between the ideal signal and the digital reproduction signal outputted from the A/D converting section, and obtains the average value of the signals as the second offset value, and offsets the digital reproduction signal outputted from the A/D converting section with use of the obtained average value.

4. The optical disk device according to claim 3, wherein, when histogram distribution of amplitude values of the reproduction signals is obtained, the predetermined reference value is an amplitude value of one of frequency crests located on both side of the peak of the frequency.

5. An optical disk reproduction method comprising the steps of:

detecting an analog reproduction signal in accordance with a waveform pattern of the reflected wave of a laser beam irradiated to an optical disk;

offsetting the analog reproduction signal detected by the reproduction detecting step with a first offset value;

converting the analog reproduction signal offset by the offset step to a digital reproduction signal and outputting the digital reproduction signal;

offsetting the digital reproduction signal from the converting step with a second offset value different from the first offset value; and decoding the digital reproduction signal offset by the second offset step with use of a maximum likelihood decoder so as to reproduce binary decoded data according to predetermined information.

6. The optical disk reproduction method according to claim 5, wherein the second offset step obtains the average value of error signals, which are the difference between an ideal signal generated based on the decoded data decoded by the maximum likelihood decoder and the digital reproduction signal outputted from the converting step, as the second offset value, and offsets the digital reproduction signal outputted from the converting step with use of the obtained average value.

7. The optical disk reproduction method according to claim 5, wherein, when a predetermined reference value and the ideal signal generated based on decoded data decoded by the maximum likelihood decoder are equal, the second offset step accumulates an error signal that is the difference between the ideal signal and the digital reproduction signal outputted from the converting step, and obtains the average value of the signals as the second offset value, and offsets the digital reproduction signal outputted from the converting step with use of obtained average value.

8. The optical disk reproduction method according to claim 7, wherein, when histogram distribution of amplitude values of the reproduction signals is obtained, the predetermined reference value is an amplitude value of one of frequency crests located on both side of the peak of the frequency.

* * * * *